__

3,151,179
OLEFIN ISOMERIZATION
Flynt Kennedy and Buddy D. Ratliff, Ponca City, Okla., assignors to Continental Oil Company, Ponca City, Okla., a corporation of Delaware
No Drawing. Filed May 23, 1960, Ser. No. 30,781
10 Claims. (Cl. 260—683.2)

This invention relates to the isomerization of olefins and more particularly to the isomerizations of normal and isoolefins containing from 4 to 6 carbon atoms in the presence of iso-$C_5$ diolefins by a process which does not cause the polymerization of isoprene.

Prior art methods for the isomerization of these compounds have involved catalytic processes generally under superatmospheric pressures using as a catalyst a solid such as an iodine compound, chromium oxide, granular magnesia, brucite, and metallic sulphides. While these methods have been more or less successful in their main objective, the reaction products must be separated from the catalyst after the reaction has been completed, a process which in itself is rather difficult.

It is, therefore, a principal object of the present invention to provide a process for the isomerization of olefins, which process obviates the disadvantages of the prior art processes.

It is another object of our invention to provide a process for the isomerization of olefins in the presence of iso-$C_5$ diolefins.

Other objects and advantages of the present process will be apparent as the invention is hereinafter more fully described.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

In accordance with our invention, an olefin is isomerized by contacting the same while in the vapor phase with a cation exchange resin at an elevated temperature and in the presence of water.

Before proceeding with a specific example illustrating our invention, it may be well to indicate in general the nature of the materials and the experimental conditions required in the process.

Cation exchange resins which may be used successfully in our process include those of the strong acid type such as sulfonated polymers. Specific materials included nuclear sulfonated polystyrene, copolymer of styrene and divinylbenzene, and phenol-formaldehyde polymer. On the other hand, weak acid type resins of which a carboxylic acid type is an example are not satisfactory.

Suitable and preferred temperatures range from about 180 to about 240° F. and 200 to 230° F., respectively.

The olefins which are employed have the general formula:

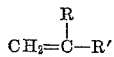

wherein R′ is selected from the group consisting of hydrogen and alkyl, R is alkyl, when R′ is hydrogen R contains at least 2 carbon atoms, and the total carbon atoms in R and R′ does not exceed 4. Suitable olefins include compounds such as normal butene, normal pentene, normal hexene, isohexene, 2-methylpentene, 3-methylpentene, 2,3-dimethylbutene, and 2-ethylbutene.

Water is necessary in the process, because the resin must be moist at all times to permit the ionization of the acid groups present in the resin, thus insuring the availability of protons for reaction with the olefin.

Preferred space velocities range from 20 to 40 v./v./hour. Obviously, if desired, space velocities may be extended beyond that range to say about 10 to 75 v./v./hour without seriously effecting the over-all results of the process.

In order to disclose the nature of the present invention still more clearly, the following illustrative example will be given. It is to be understood, however, that the invention is not to be limited to the specific conditions or details set forth in this example except insofar as such limitations are specified in the appended claims.

*Example*

A hydrocarbon mixture that contained the following materials:

| Compound: | Mole percent |
|---|---|
| Isoprene | 36.9 |
| 2-methyl-2-butene | 35.0 |
| 2-methyl-1-butene | 20.8 |
| 3-methyl-1-butene | 4.3 |
| light ends | 3.0 | was vaporized with sufficient distilled water to provide a steam-to-hydrocarbon ratio of 3.9 to 1, passed through a bed of Amberlite IR-120 [1] resin at 220° F. and condensed. The space velocity of the hydrocarbon mixture was 28.4 v./v./hour, and the residence time was 9.85 sec. The condensed material analyzed as follows:

| Compound: | Mole percent |
|---|---|
| Isoprene | 35.6 |
| 2-methyl-2-butene | 41.4 |
| 2-methyl-1-butene | 14.9 |
| 3-methyl-1-butene | 4.2 |
| light ends | 2.4 |
| heavy ends | 1.5 |

It can be seen that the ratio of 2-methyl-2-butene to 2-methyl-1-butene plus 3-methyl-1-butene has increased from 1.39 to 2.17, or an increase in the ratio of 56 percent.

While we do not wish to be bound as to any particular theory as to how our results are attained, we believe a correct explanation equationwise is substantially as follows:

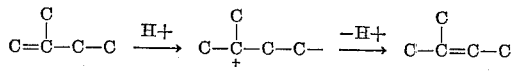

In other words, the reaction is the classical acid-catalyzed isomerization via the carbonium ion.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having been described, what is claimed and desired to be secured by Letters Patent is:

1. A process for shifting the double bond of a monoolefin of the general formula:

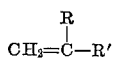

wherein R′ is selected from the group consisting of hydrogen and alkyl, R is alkyl, when R′ is hydrogen R contains at least 2 carbon atoms and the total carbon atoms in R and R′ does not exceed 4, which comprises vaporizing said olefin and passing a stream of vapor consisting of ---
[1] Trade name for nuclear sulfonated polystyrene.

water vapor and the vaporized olefin over a protonated ion exchange resin consisting of a sulfonated polymer at an elevated temperature in the range of 180 to 240° F. together with a sufficient amount of water vapor to maintain said resin in a moist condition.

2. The process of claim 1 wherein the olefin is a normal alpha olefin.

3. The process of claim 2 wherein the olefin is normal butene.

4. The process of claim 2 wherein the olefin is normal pentene.

5. The process of claim 2 wherein the olefin is normal hexene.

6. The process of claim 1 wherein the olefin is an iso-olefin.

7. The process of claim 6 wherein the olefin is isohexene.

8. The process of claim 7 wherein the protonated ion exchange resin is a sulfonated polystyrene polymer.

9. The process of claim 8 wherein the temperature is maintained within the range of 200 to 230° F.

10. The process of claim 9 wherein the vaporized olefin is passed over said ion exchange resin at a space velocity varying from 20 to 40 v./v./hour.

References Cited in the file of this patent

UNITED STATES PATENTS

| | | |
|---|---|---|
| 2,477,380 | Kreps | July 26, 1949 |
| 2,803,667 | Chambers | Aug. 20, 1957 |
| 2,813,908 | Young | Nov. 19, 1957 |